United States Patent [19]
Amir-Alikhani

[11] Patent Number: 5,235,621
[45] Date of Patent: Aug. 10, 1993

[54] RECEIVER SYSTEMS

[75] Inventor: Hamid Amir-Alikhani, Chineham, England

[73] Assignee: Orbitel Mobile Communications Limited, Bracknell, England

[21] Appl. No.: 699,685

[22] Filed: May 14, 1991

[30] Foreign Application Priority Data

May 17, 1990 [GB] United Kingdom ............... 9011119

[51] Int. Cl.$^5$ .................... H04B 7/10; H04L 1/02
[52] U.S. Cl. ................................ 375/100; 455/133
[58] Field of Search ................. 375/38, 40, 11, 100; 455/132–134, 59, 60, 33.1, 272; 379/58, 59; 371/43

[56] References Cited

U.S. PATENT DOCUMENTS

| 4,884,272 | 11/1989 | McConnell | 375/100 X |
| 5,095,535 | 3/1992 | Freeburg | 455/65 X |

FOREIGN PATENT DOCUMENTS 0332290 9/1989 European Pat. Off.
0388163 9/1990 European Pat. Off.

OTHER PUBLICATIONS

L. B. Lopes, "Performance of Viterbi Equilisers for the GSM System," pp. 61–66, Second IEE National Conference on Telecommunications 1989, IEE London.

Primary Examiner—Curtis Kuntz
Assistant Examiner—Tesfaldet Bocure
Attorney, Agent, or Firm—Leydig, Voit & Mayer

[57] ABSTRACT

A receiver system for a mobile telephone system comprises two or more antenna spaced a distance apart from each other greater than the wavelength of incident radiation, and a receiver. Each antenna is coupled to a respective receiver channel of the receiver, each receiver channel comprising an RF means for processing the received signals, and equaliser means for equalising and/or decoding the signals from the RF means. The equaliser means includes metric generating means for generating metric information which provides probability measures for a sequence of time intervals and for a multiplicity of possible states of the receiver within each time interval that the received signal has put the receiver into the respective states, and selector means for comparing the values of corresponding metrics from respective receiver channels for selecting received data from the receiver channel having the higher probability of accuracy.

7 Claims, 5 Drawing Sheets

RECEIVER SYSTEMS

BACKGROUND OF THE INVENTION

1. Field of the Invention

This invention relates to receiver systems. In particular the invention relates to receiver systems for mobile telephone systems.

2. Description of the prior art

With the impending adoption of the GSM (Groupe Speciale Mobile) system for a Pan-European Mobile Telephone System [see for example Electronics and Communication Engineering Journal January/February 1989 vol. 1 no. 1 pp. 7 to 13, "Pan-European cellular radio", D. M. Balston], a number of difficult technical problems have to be overcome for satisfactory implementation of the system.

In mobile telephone systems such as GSM, or PCN (Personal Communications Network), data to be transmitted is modulated on to a UHF band (300 MHz–3 GHz) carrier utilising the digital modulation techniques, e.g. Gaussian minimum shift keying. In GSM, frequency channels are provided at a spacing of 200 KHz and data is transmitted on each channel at a total rate of 270.833 Kbits/s.

Referring to FIG. 1, this shows the basic format of one frequency channel for mobile telephone systems transmissions as comprising a series of frames (Time Domain Multiple Access Frames), each frame comprising eight multiplexed time slots from different mobile stations. Each frame is 4.615 ms in length and each time slot 0.577 ms in length. The structure of a time slot as shown comprises two sections of data separated by control bits, a training sequence, tail bits etc. Data is transmitted from each mobile station within a time slot in compressed format at a rate of 13 kbits$^{-1}$.

Given the very tight technical constraints of mobile telephone systems, interference and data loss and corruption can easily occur.

A major problem is that of multipath, since the transmissions reflect from buildings, hills, high-sided vehicles etc. Many different reflections can reach the same position of a mobile or base station, however, and even when there is a direct path it is not unknown for strong reflections to be received as well. The radio paths taken by the reflections are longer than the direct path and at the bit rates chosen for mobile telephone systems the difference in path length can be equivalent to several bit periods. FIG. 2 demonstrates this effect, and it can be seen that the combined signal received at the mobile's antenna can be severely corrupted.

To date existing radio systems have substantially avoided this multipath effect by choosing bit rates which are long compared with the expected multipath delays. In mobile telephone systems, equalisation is employed to recover the wanted signal despite severe multipath corruption.

Equalisation works by making an estimate of the impulse response of the transmission medium and then constructing an inverse filter through which the received signal is passed. There are several methods for estimating the transfer function of the transmission path and several variations of algorithm associated with each, but whatever the method they all rely on receiving a known sequence of data. This is the training sequence which is transmitted in the middle of each time slot. The receiver detects this sequence, and, knowing what bit pattern it represents, is able to estimate the transfer function most likely to have produced the signal received. The calculation of the coefficients of the filter required to compensate for the response is then relatively straightforward.

The multipath effects can change very rapidly in practice. The wavelength at 900 MHz is only 30 cm and thus a change in the differential path length of only 15 cm between two signals received at an antenna can change their interference from constructive to destructive. The mobile telephone system specifications are designed to accommodate vehicles moving at up to 250 km/h and thus the mobile could have moved up to 32 cm in the 4.6 ms between successive traffic channel time slots. Add to this the problems of reflections from other moving vehicles and it is clear that each time slot has to be treated independently. The equalisation technique commonly employed is based upon the Viterbi algorithm.

One particular problem which arises from multipath is that of fading which is caused by destructive interference between two signals taking different paths to the receiver.

As mentioned above, a mobile may have moved a distance in the 4.6 ms between successive channel time slots of up to 32 cm, which is about the same as the wavelength of 900 MHz radiation. Thus interference may have changed from constructive to destructive within the space of adjacent channel time slots.

SUMMARY OF THE INVENTION

It is an object of the invention to overcome the problem of fading, as described above.

In accordance with the present invention, there is provided a receiver system for a mobile telephone system comprising two or more antenna spaced a distance apart from each other greater than the wavelength of incident radiation, preferably at least about the order of ten times the wavelength of the incident radiation, a receiver, each antenna being coupled to a respective receiver channel of the receiver, each receiver channel comprising an RF means for processing the received signals, equaliser means for equalising and/or demodulating the signals from the RF means, and the equaliser means including metric generating means for generating metric information which provides probability measures for a sequence of time intervals and for a multiplicity of possible states of the receiver within each time interval that the received signal has put the receiver into the respective states, and selector means for comparing the values of corresponding metrics from respective receiver channels for selecting received data from the receiver channel having the higher probability of accuracy.

Thus in accordance with the invention a metric is generated which directly reflects the accuracy or confidence that a particular signal sequence processed by the equaliser is a correctly demodulated version of the original transmitted signal sequence. Such metric has advantages in that it is provided in any event for demodulating the data and it is not necessary to provide a metric generator specifically for the purpose of the present invention.

In one form, the metric information comprises an accumulated cost metric representing the Hamming distance associated with the most likely sequence of a message sequence.

In another form, the metric information comprises a branch metric, for each receiver state at each time interval, which provides a measure of the probability that the receiver entered that state from one of n possible routes from receiver states in the preceding time interval.

BRIEF DESCRIPTION OF THE DRAWINGS

One embodiment of the invention will now be described, by way of example only, with reference to the accompanying drawings wherein.

DESCRIPTION OF THE PREFERRED EMBODIMENT

Figure 3:
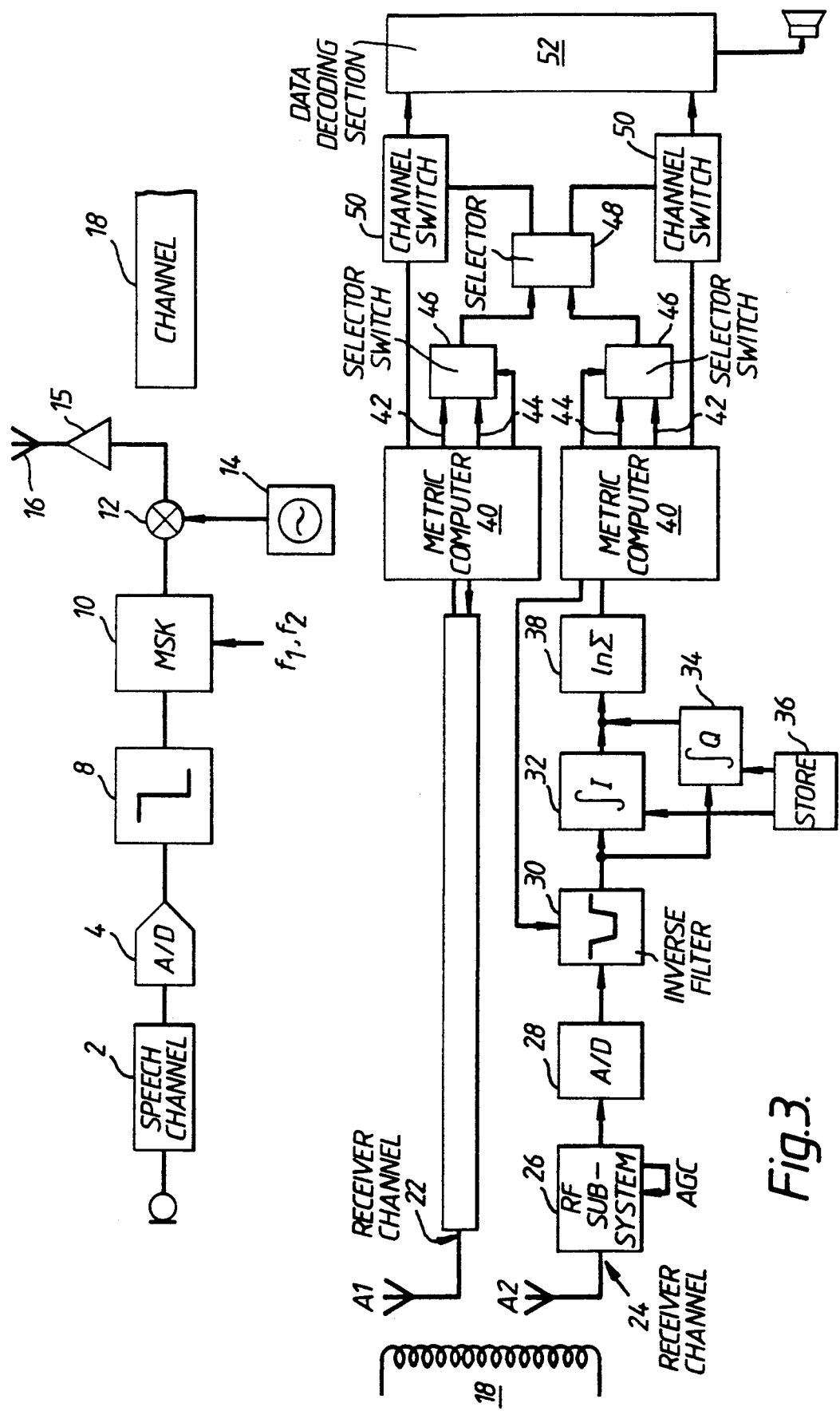
FIG. 3 is a block diagram of a communication system in accordance with the embodiment of the invention.

Referring to FIG. 3, there is shown a communication system incorporating a receiver in accordance with the embodiment of the invention, wherein the transmitter section includes a speech channel 2, an analog to digital converter 4 for digitising speech signals, an encoder 6 which imposes a block or convolutional coding scheme which is employed to enable error correction at the receiving end.

The encoded data is fed to a Gaussian Low Pass filter 8 which operates to limit the bandwidth of the transmitted signal to the lower harmonics of the baseband signals.

The output from the Gaussian Low Pass filter 8 is fed to a minimum shift keying (MSK) modulator 10 (a special form of phase shift keying with sinusoidal weighting) which modulates the signal with two frequencies $f_1$, $f_2$, the difference between the two frequencies being related to the bit period ($h = T(f_1 - f_2)$). The depth of modulation is determined by the factor BT, where T is the bit period and B is a bandwidth factor. The effect of the Gaussian filter 8 in the time domain is to spread the modulation representing a current data bit into a sequence of say five bit periods. The output from Gaussian filter 8 is modulated in a mixer 12 on to a UHF carrier wave 14, amplified in power amplifier 15 and is transmitted from antenna 16 via a channel 18. As described above, severe multipath will frequently be experienced in channel 18 in addition to noise and other atmospheric effects and this may be regarded from the point of view of the receiver as a further convolutional encoding of the transmitted data.

The receiver comprises two antenna A1 and A2, each comprising a conventional vertical omnidirectional antenna, the two antenna being spaced a distance between five and ten metres apart. Each antenna A1, A2 is coupled to a respective receiver channel 22, 24, which are identical, similar parts being referred to by the same reference numeral. Each channel includes an RF subsystem 26 which processes the input RF signal, in particular by setting a suitable gain control level, for deriving a base band signal from the RF signal. An analog to digital converter 28 is provided which samples the signal sufficiently fast to provide in phase (I) and quadrature phase (Q) components. The digitised values are fed to an inverse filter section 30, whose filter coefficients are determined in an adaptive manner by a metric computer 40. Inverse filter 30 compensates for the channel impairment between the transmitter and receiver caused by multipath and other effects. The thus compensated data samples are fed into I and Q channels 32, 34 where correlations take place by integration with a selected number of stored signal sets from a store 36. The results of the two correlations in the I and Q paths are summed as at 38 and the logarithm of this summed value is derived. The output from unit 38 is a log-likelihood function, i.e. the metric In p(y/x), i.e. the conditional probability of receiving y (where y is one of a set of Y received signals, i.e. the stored set) given that x was sent (where x is one of a set of X transmitted signals).

The output from unit 38 is a quantised version of the probability, having one of eight values from 000 to 111.

A metric computer section 49 is provided, which operates in accordance with a Viterbi algorithm to choose that metric ln p(y/x) which is a maximum or in other words where the Hamming distance between the two vectors y and x is minimised.

It will be understood that in order properly to demodulate and decode data, it will be necessary to employ the Viterbi algorithm more than once. Thus as a first step it is necessary to provide proper equalisation by correlating the received version of the midamble fixed sequence with a stored version of the sequence, and compute by means of the Viterbi algorithm the most likely form of the distortion or "encoding" which is applied to the fixed sequence by the channel. It is then possible to determine the coefficients of the tapping points of a finite impulse response filter (FIR) constituting filter 30 in order to compensate for the effects of the multipath. It will be understood it is necessary to take into account the "spreading" effect of the Gaussian filter during the equalisation process.

Since a signal relating to one bit period may be "spread" by the Gaussian filter over a sequence of say five bit periods, the stored signal set is modified to emulate the effect of the Gaussian filter. Hence the stored signal sets which are correlated with the incoming received signal are therefore at least five bit periods long.

Having determined the coefficients of the filter 30, it is then possible to demodulate the transmitted data in the blocks on either side of the training sequence in the respective traffic channel. This is done in the same manner as in the equalisation process described above, by correlation with stored signal sets, and determining the most likely sequence by means of a Viterbi Algorithm.

In the present invention, the metrics derived are employed to decide which receiver channel is giving the higher quality data. It would be possible to employ the metrics generated when equalisation takes place by the processing of the midamble. This has the advantage that a decision as to which channel to select may be made before the message sequence is processed.

Figure 1:
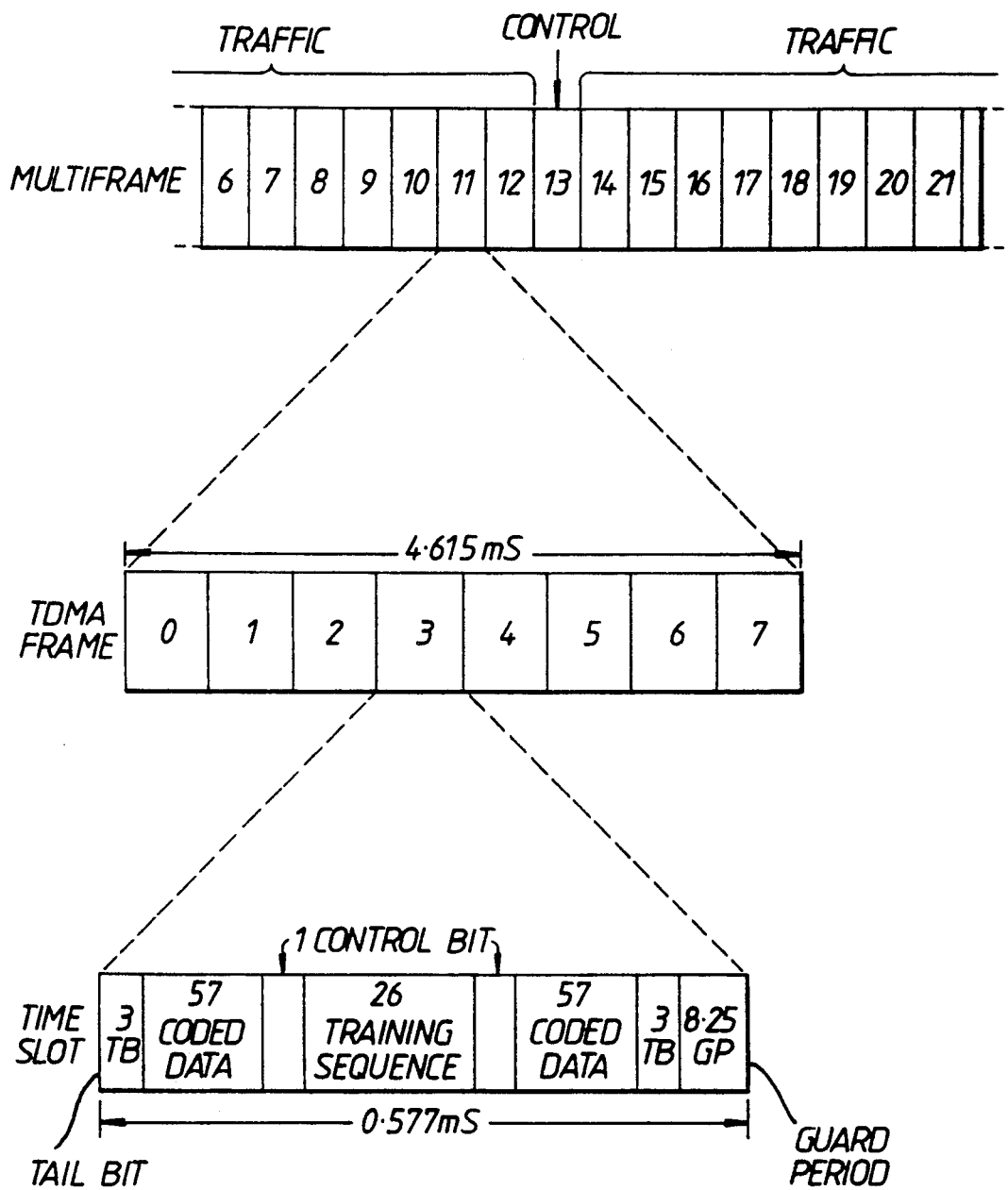
FIG. 1 is a diagram showing the basic format of one frequency channel for GSM transmission.
Figure 2:
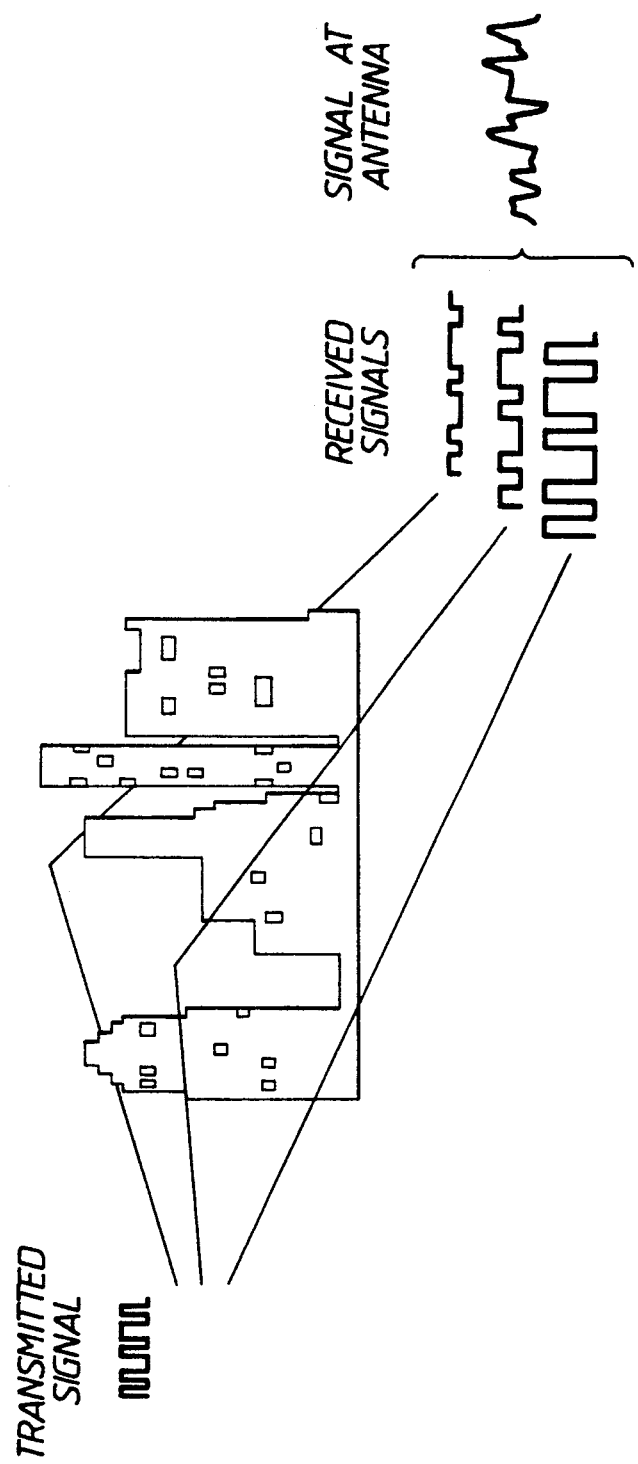
FIG. 2 is a schematic view of multipath effects.

However as shown in FIG. 1, the message sequence is made up of first and second blocks on either side of the midamble, and a more accurate measure of data reliability is to employ the metrics generated in the demodulation of the first and second blocks to decide which channel provides the better accuracy for the current data processed.

Figure 5:
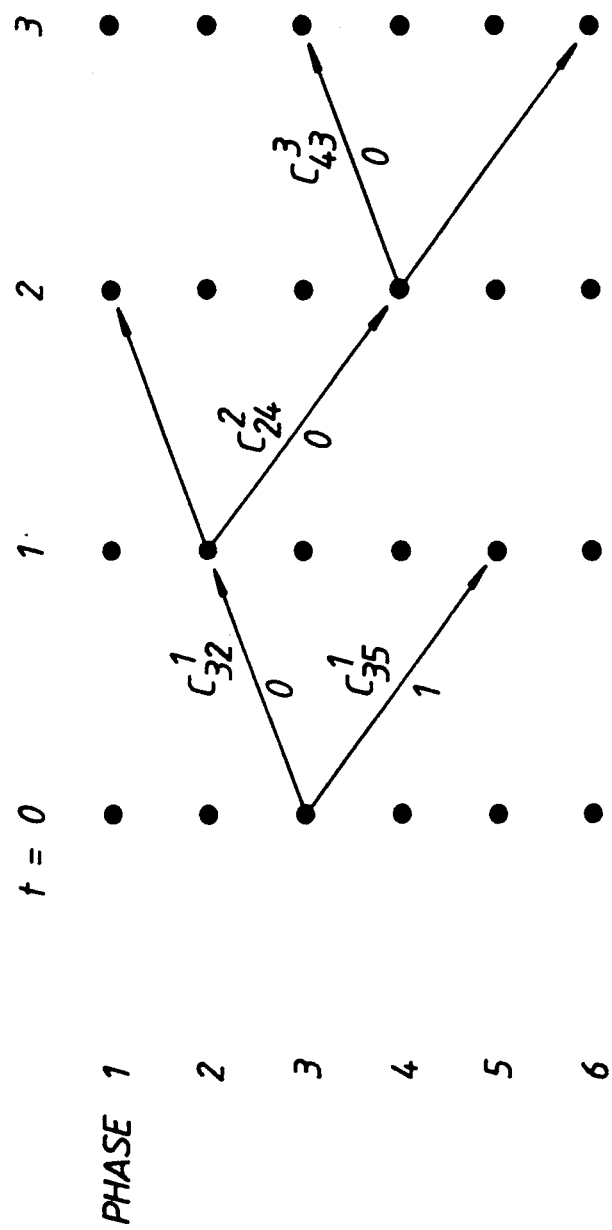
FIG. 5 is a schematic view of a trellis diagram and associated generated metrics computed by the receiver of FIG. 3.

It will be understood that given the complexity of the transmitter section and the multipath effects between transmitter and receiver, the total number of possibilities in the received signal sequences is very large. It is necessary therefore to make drastic simplifications to reduce the number of possibilities and in accordance with well known techniques, the metric computer generates in code form the equivalent of a trellis structure as shown in FIG. 5. In FIG. 5, a vertical column represents a bit period and the various nodes in a vertical column represent the various possible states which the receiver may occupy in that bit period. For example as shown in FIG. 5, for each bit period, six states are selected as of interest representing all significant combinations of the value of the decoded symbol over the previous five bit periods. Given that the receiver is determined as in one of the states, the receiver may proceed to one of two new states in the next vertical column, depending on the value determined as the current received signal. By convention a zero ($\phi = -\pi/2$) value of the current symbol specifies an upper branch of the two branches exiting a state whereas a one ($\phi = +\pi/2$) value of the current symbol specifies the lower branch. The Viterbi algorithm operates to compute the most likely path through the trellis. In order to do this the algorithm computes a metric for every possible path in the trellis, the metric being as defined above i.e. the Hamming distance between the coded sets sequence represented by that path and the received sequence. Thus for each node or state the algorithm compares the two paths entering the node, the path with the lower metric is retained and the other path is discarded. Thus the algorithm operates as follows:

1. For a message sequence, starting at the initial time period, the branch metric is computed for the single path entering each state (S) of the receiver. Store the path (survivor) and its metric (M) for each state.

2. Increment the time interval (bit period) by one. Compute the metric for all the paths entering each state (S) by adding the metric (M) of the incoming branches to the metric of the connecting survivor from the previous time unit. For each state, identify the path with the lowest metric as the survivor of step 2. Store the survivor and its metric.

3. Repeat step 2 for the duration of the message sequence—then stop.

Thus it can be seen that in order to calculate the most likely data sequence of a received message, two metrics are computed, namely a branch metric for each state (S) or node at each time interval, the branch metric having two values ($m_1, m_2$) and reflecting the probability is of that the receiver will enter that state by one of two paths. In addition there is an accumulated cost metric which represents the probability that the receiver will be entering a particular state by a particular route from the initial time period, and represents a summation of the selected branch metrics for that particular route.

In the present embodiment, the receiver has the ability to act on either of two metrics computed by the algorithm, either the accumulated cost metric or the branch metric. For the accumulated cost metric, this is computed for each of the first and second blocks data on either side of the training sequence (see FIG. 1), and a decision is made as to which receiver channel provides the higher metric. This is a relatively coarse measure of data reliability and would normally be employed where there is a clear difference between the two metrics. If, however, there is not a significant difference between the two accumulated cost metrics of the respective receiver channels, or if a higher data accuracy is required, then in the present embodiment, comparison is made on a bit by bit basis of the branch metric. The present embodiment operates by subtracting the two values of the branch metric computed ($m_1 - m_2$) and then compares this differential value with the corresponding value computed for the other receiver channel. The data bit having the higher differential is selected as the more accurate bit. The branch metric is also known as the "soft-decision".

Referring back to FIG. 3, the metric computer 40 will act to produce the two different sets of metrics on the signal received in that channel. The metrics are output on lines 42,44, the differential branch metric for any particular time interval being output on line 42, and the accumulated cost metric being output on line 44 at the end of a message sequence. A selector switch 46 is provided to determine which metric will be forwarded to a selector 48 which compares the metrics from the respective signal channels and selects a respective channel switch 50 to forward the data from the receiver channel having the highest metric, to a data decoding section 52 comprising a Viterbi processor.

Figure 4:
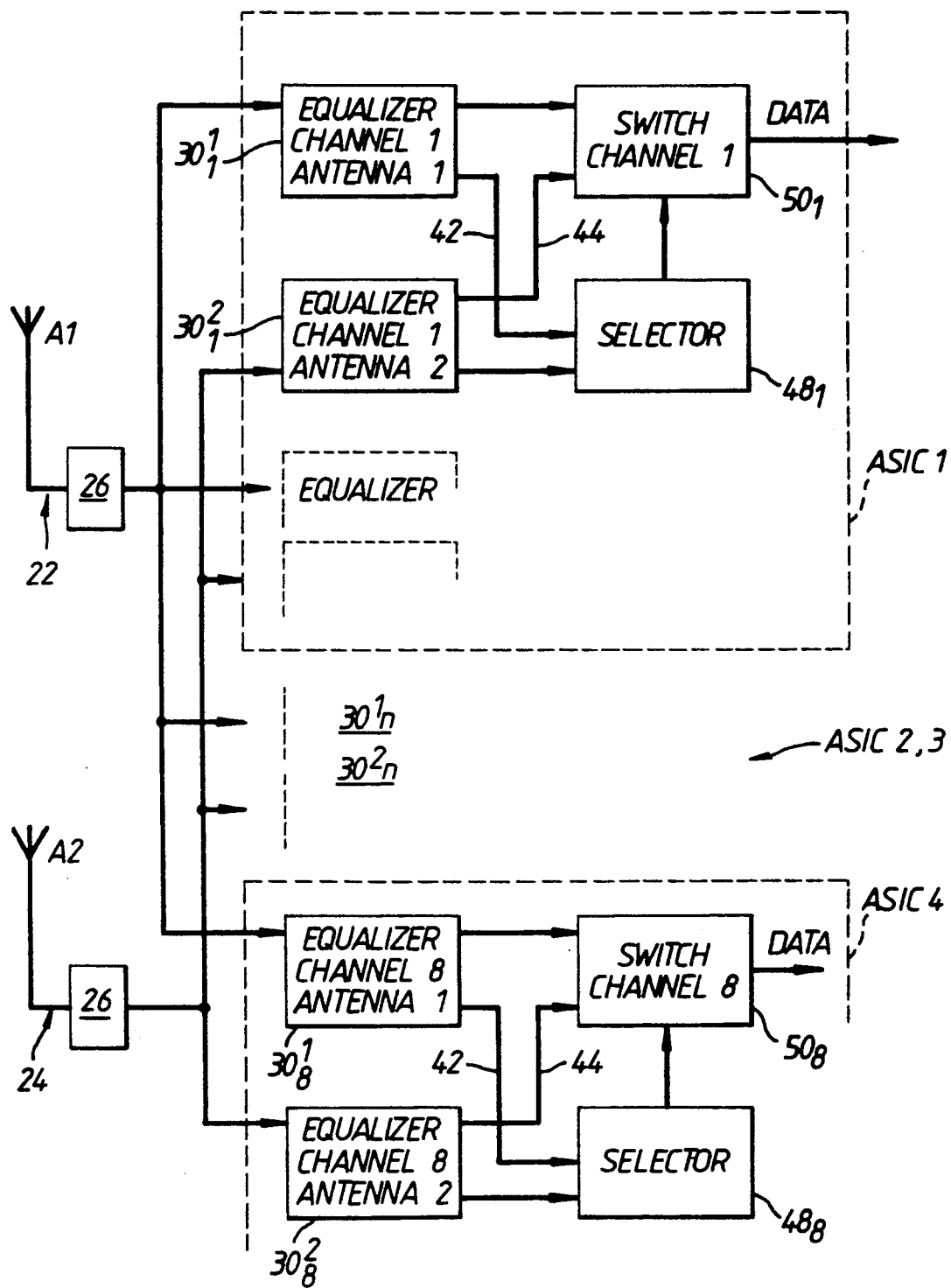
FIG. 4 is a schematic diagram of an equaliser section of the receiver of FIG. 3.

It will be understood that in the case of a GSM system, when receiving a traffic channel, eight different channels are provided in a TDMA frame and the arrangement of FIG. 4 is therefore provided.

Referring to FIG. 4 which is another block diagram of the receiver, similar parts to that of FIG. 3 are identified by the same reference numeral. Receiver channel 22 is connected to a first set of equaliser sections $30^1$ to $30^1$ and receiver channel 24 is coupled to a set of eight identical equaliser channels $30^2$ to $30^2$. Thus each antenna has a respective receiver channel comprising eight identical equaliser sections, each equaliser section being adapted to process a single time slot of a traffic frame in order to decode the data within that channel of the frame. Each equaliser has a data output 60 in addition to metric outputs 42,44. The metric output on lines 42,44 is applied to selectors $48_1$ to $48_8$, one selector being provided for each pair of equaliser sections $1_n$ to $8_n$. Selector $48_n$ is operative to select the metric having the greater value and to operate an associated data switch $50_n$ to pass the data from the equaliser section having the metric.

In a practical embodiment, four separate equaliser sections are formed on one ASIC (application specific integrated circuit), a total of four ASICS thus being required for this part of the receiver.

It may therefore be seen there has been shown and described a mobile telephone system receiver for a base station where antenna space diversity is provided to increase the probability of receiving a usable radio signal, the selection of signal path to be used being based on generated metrics. In the past where spaced antenna have been connected to entirely separate receivers, the decision as to the better signal path has been based on signal strength, signal to noise ratio, or data error rate. The data error rate is generally measured by reference to the decoding errors of a coding system.

Signal strength selection suffers from the possibility of high levels of interference from adjacent channels corrupting the demodulated signal. Signal to noise ratio is difficult to determine for an approximately random data signal, it being difficult to separate signal from noise. Data error rate requires all signal paths to be fully decoded to determine the best path which involves considerable time delays.

In the present system a signal path equaliser is used to overcome the effects of multipath delays which exceed the data bit rate. The equaliser correlates with a predetermined synchronisation message within the data.

The described embodiment illustrates a method of deciding which equaliser signal output (one per antenna/receiver path) is to be used for subsequent operations. The equaliser output may be used directly as demodulated data or may require further decoding.

Each equaliser produces a measure of the accuracy of the data decoded. This measure may be for a data burst or block, or for part of a data burst or block.

This measure of accuracy is available when the data has been processed by the equaliser, and a separate function compares the measure produced by each equaliser and determines the best, to choose which equaliser output should subsequently be used.

What I claim is:

1. A receiver for a mobile telephone system,
   comprising two or more antenna spaced a distance apart from each other greater than the wavelength of incident radiation,
   a respective receiver channel coupled to each antenna, each receiver channel comprising RF means for processing signals received by the respective antenna and storage means for storing a set of predetermined states, each state in the set representing a different one of a plurality of possible combinations of signals that can be received in the respective receiver channel during successive time intervals, and each receiver channel comprising equalizer means for equalising and/or demodulating the signals from the RF means, the equaliser means including metric generating means for generating metric information which provides probability measure for a sequence of time intervals that signals received in the respective receiver channel correspond to the respective states,
   and selector means for comparing the metric information for the respective receiver channels for selecting received signals from the receiver channel having the higher probability of accuracy.

2. A receiver as claimed in claim 1 wherein said metric information comprises an accumulated cost metric representing the Hamming distance associated with the most likely sequence of a message sequence.

3. A receiver system as claimed in claim 2 wherein the message sequence comprises a block of data on one side of the training sequence in a time slot of a TDMA frame of a mobile telephone system.

4. A receiver as claimed in claim 1, wherein said metric information comprises a branch metric, for each said state at each successive time interval, providing a measure of the probability that said state was reached by one of n possible routes from states in the preceding time interval.

5. A receiver as claimed in claim 4 wherein the metric information comprises the difference between the metrics computed for the routes entering each state.

6. A receiver as claimed in claim 1 wherein the metric information gathered from the equalisation process is employed to select the appropriate receiver channel.

7. A receiver as claimed in claim 1 incorporated in a mobile telephone system.

* * * * *